(12) United States Patent
Fini et al.

(10) Patent No.: US 8,693,088 B2
(45) Date of Patent: Apr. 8, 2014

(54) MULTICORE TRANSMISSION AND AMPLIFIER FIBERS AND SCHEMES FOR LAUNCHING PUMP LIGHT TO AMPLIFIER CORES

(75) Inventors: John M. Fini, Jersey City, NJ (US); Thierry F. Taunay, Bridgewater, NJ (US); Man F. Yan, Berkeley Heights, NJ (US); Benyuan Zhu, Princeton, NJ (US)

(73) Assignee: OFS Fitel, LLC, Norcross, GA (US)

( * ) Notice: Subject to any disclaimer, the term of this patent is extended or adjusted under 35 U.S.C. 154(b) by 461 days.

(21) Appl. No.: 13/049,320

(22) Filed: Mar. 16, 2011

(65) Prior Publication Data

US 2011/0279888 A1  Nov. 17, 2011

Related U.S. Application Data

(60) Provisional application No. 61/314,181, filed on Mar. 16, 2010.

(51) Int. Cl.
| | |
|---|---|
| *H01S 3/094* | (2006.01) |
| *H01S 3/067* | (2006.01) |
| *G02B 6/42* | (2006.01) |
| *H01S 3/30* | (2006.01) |
| *G02B 6/02* | (2006.01) |
| *G02B 6/35* | (2006.01) |

(52) U.S. Cl.
CPC ............ *H01S 3/06737* (2013.01); *H01S 3/302* (2013.01); *H01S 3/06754* (2013.01); *H01S 3/094038* (2013.01); *H01S 3/094061* (2013.01); *G02B 6/4296* (2013.01); *G02B 6/02042* (2013.01); *G02B 6/3502* (2013.01); *G02B 6/425* (2013.01)

USPC ........... 359/334; 359/341.3; 385/126; 385/50

(58) Field of Classification Search
CPC ............. G02B 6/4296; G02B 6/02042; G02B 6/3502; G02B 6/425; G02B 6/4287; H01S 3/06737; H01S 3/302
USPC ...................................... 359/334; 385/50, 126
See application file for complete search history.

(56) References Cited

U.S. PATENT DOCUMENTS 4,315,666 A  *  2/1982  Hicks, Jr. .......................... 385/30
4,546,476 A  *  10/1985  Shaw et al. ....................... 372/6
(Continued)

FOREIGN PATENT DOCUMENTS

JP  60031105 A  *  2/1985  ................ G02B 6/36
JP  60120585 A  *  6/1985  ................ H01S 3/30
(Continued)

*Primary Examiner* — Mark Hellner
*Assistant Examiner* — Ari M Diacou
(74) *Attorney, Agent, or Firm* — Jacobs & Kim LLP

(57) ABSTRACT

An optical transmission and amplification system includes a multichannel transmission span with a length of a multicore transmission fiber having a plurality of individual transmission cores. A first tapered multicore coupler provides connectivity between the plurality of transmission cores of the multicore fiber and a respective plurality of individual transmission leads. A fiber amplifier is provided having a plurality of individual cores including at least one pump core and a plurality of amplifier core. A second tapered multicore coupler provides connectivity between the amplifier cores of the fiber amplifier and a respective plurality of amplifier leads, and between the at least one pump core and a respective pump lead.

14 Claims, 12 Drawing Sheets

(56) References Cited

U.S. PATENT DOCUMENTS

| | | | |
|---|---|---|---|
| 4,603,421 A * | 7/1986 | Scifres et al. | 372/50.12 |
| 4,773,924 A * | 9/1988 | Berkey | 65/409 |
| 4,778,238 A * | 10/1988 | Hicks | 398/92 |
| 4,799,949 A * | 1/1989 | Keck et al. | 65/409 |
| 4,886,333 A * | 12/1989 | Hicks | 385/12 |
| 4,948,217 A * | 8/1990 | Keck et al. | 385/24 |
| 5,379,357 A * | 1/1995 | Sentsui et al. | 385/11 |
| 5,448,661 A * | 9/1995 | Takai et al. | 385/24 |
| 5,548,672 A * | 8/1996 | Hattori et al. | 385/43 |
| 5,566,196 A * | 10/1996 | Scifres | 372/6 |
| 5,742,722 A * | 4/1998 | Imoto | 385/126 |
| 5,748,820 A | 5/1998 | Le Marer et al. | |
| 5,933,271 A * | 8/1999 | Waarts et al. | 359/341.31 |
| 6,480,659 B1 * | 11/2002 | Patlakh et al. | 385/125 |
| 6,539,155 B1 * | 3/2003 | Broeng et al. | 385/125 |
| 6,611,648 B2 * | 8/2003 | Kumar et al. | 385/126 |
| 6,628,876 B1 * | 9/2003 | Shmulovich | 385/129 |
| 6,975,898 B2 * | 12/2005 | Seibel | 600/473 |
| 7,016,573 B2 * | 3/2006 | Dong et al. | 385/46 |
| 7,034,992 B2 * | 4/2006 | Komine | 359/334 |
| 7,272,956 B1 * | 9/2007 | Anikitchev et al. | 65/409 |
| 7,289,707 B1 * | 10/2007 | Chavez-Pirson et al. | 385/116 |
| 7,327,920 B2 * | 2/2008 | Dong et al. | 385/115 |
| 7,492,993 B2 * | 2/2009 | Nakai et al. | 385/46 |
| 7,813,603 B2 * | 10/2010 | Nikolajsen | 385/39 |
| 7,845,860 B2 * | 12/2010 | Fiorentino et al. | 385/89 |
| 8,085,464 B2 * | 12/2011 | Gonthier et al. | 359/341.3 |
| 8,488,235 B2 * | 7/2013 | Rothenberg | 359/349 |
| 2002/0105715 A1 * | 8/2002 | Naito et al. | 359/334 |
| 2002/0146226 A1 * | 10/2002 | Davis et al. | 385/126 |
| 2002/0176677 A1 * | 11/2002 | Kumar et al. | 385/126 |
| 2003/0048524 A1 * | 3/2003 | Chavez-Pirson et al. | 359/333 |
| 2005/0087714 A1 * | 4/2005 | Komine | 372/3 |
| 2006/0010920 A1 * | 1/2006 | Cheo | 65/390 |
| 2007/0274651 A1 | 11/2007 | DiGiovanni et al. | |
| 2009/0092157 A1 | 4/2009 | Gapontsev | |
| 2009/0103874 A1 | 4/2009 | Broeng et al. | |
| 2009/0201575 A1 * | 8/2009 | Fermann et al. | 359/341.32 |
| 2010/0278486 A1 * | 11/2010 | Holland et al. | 385/43 |
| 2011/0032603 A1 * | 2/2011 | Rothenberg | 359/341.1 |
| 2011/0032604 A1 * | 2/2011 | Rothenberg et al. | 359/341.4 |
| 2011/0129231 A1 * | 6/2011 | Fiorentino et al. | 398/141 |
| 2011/0141555 A1 * | 6/2011 | Fermann et al. | 359/341.3 |
| 2011/0280517 A1 * | 11/2011 | Fini et al. | 385/43 |
| 2012/0087626 A1 * | 4/2012 | Nagashima et al. | 385/124 |
| 2012/0183304 A1 * | 7/2012 | Winzer et al. | 398/142 |
| 2013/0063809 A1 * | 3/2013 | Nishihara et al. | 359/341.2 |

FOREIGN PATENT DOCUMENTS

| | | | | |
|---|---|---|---|---|
| JP | 06018744 A * | 1/1994 | | G02B 6/28 |
| JP | 09230156 A * | 9/1997 | | G02B 6/16 |
| JP | 10125988 A * | 5/1998 | | H01S 3/10 |

* cited by examiner

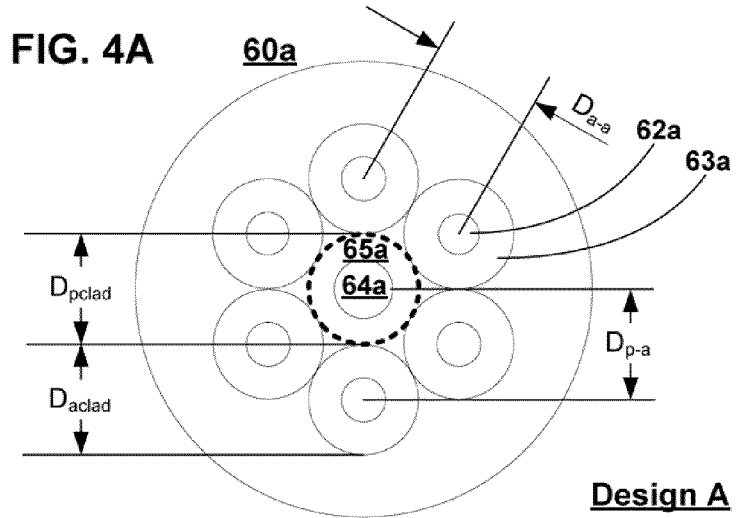
FIG. 4A — Design A
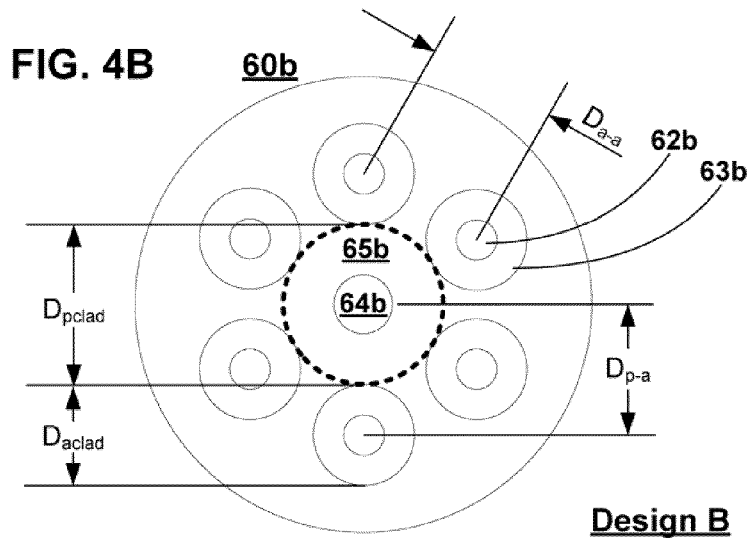
FIG. 4B — Design B
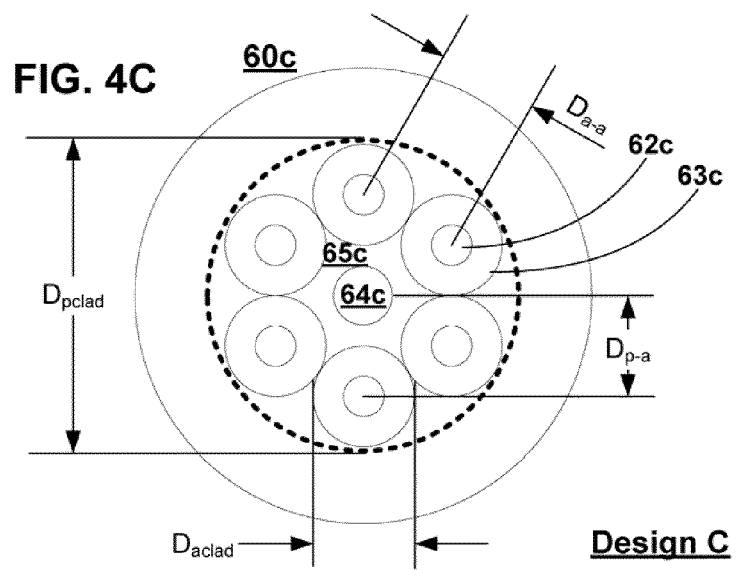
FIG. 4C — Design C

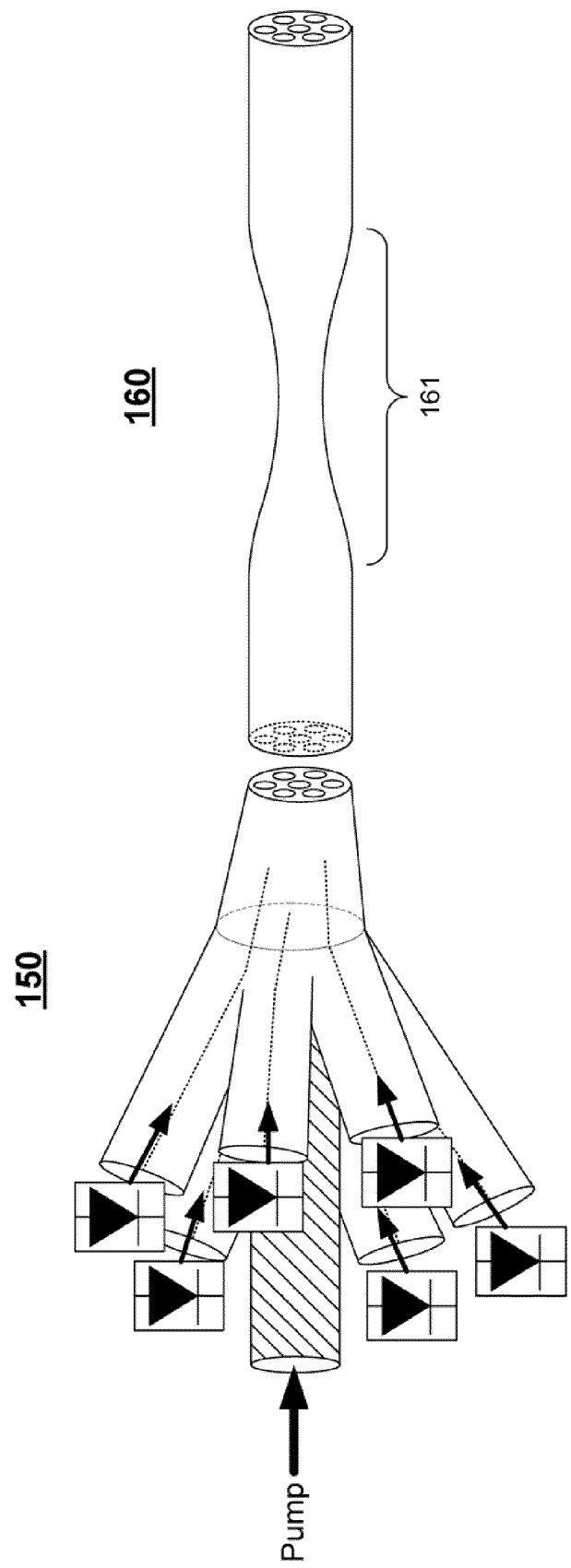

| TABLE 1: Amplifier Core Refractive Index Profile Values ||||
|---|---|---|---|
| Fiber Region | Δn | Outer Radius (untapered) | Outer Radius (tapered) |
| Core | 0.030 | 2.8 μm | 1.40 μm |
| Outer Cladding | 0.000 | 50.0 μm | 25.0 μm |

FIG. 9A

| TABLE 2: Pump Core Refractive Index Profile Values ||||
|---|---|---|---|
| Fiber Region | Δn | Outer Radius (untapered) | Outer Radius (tapered) |
| Core | 0.013 | 3.0 μm | 1.50 μm |
| Pedestal | 0.000 | 25.0 μm | 12.5 μm |
| Ring | 0.010 | 30.0 μm | 15.0 μm |
| Outer Cladding | −0.005 | 50.0 μm | 25.0 μm |

FIG. 9B

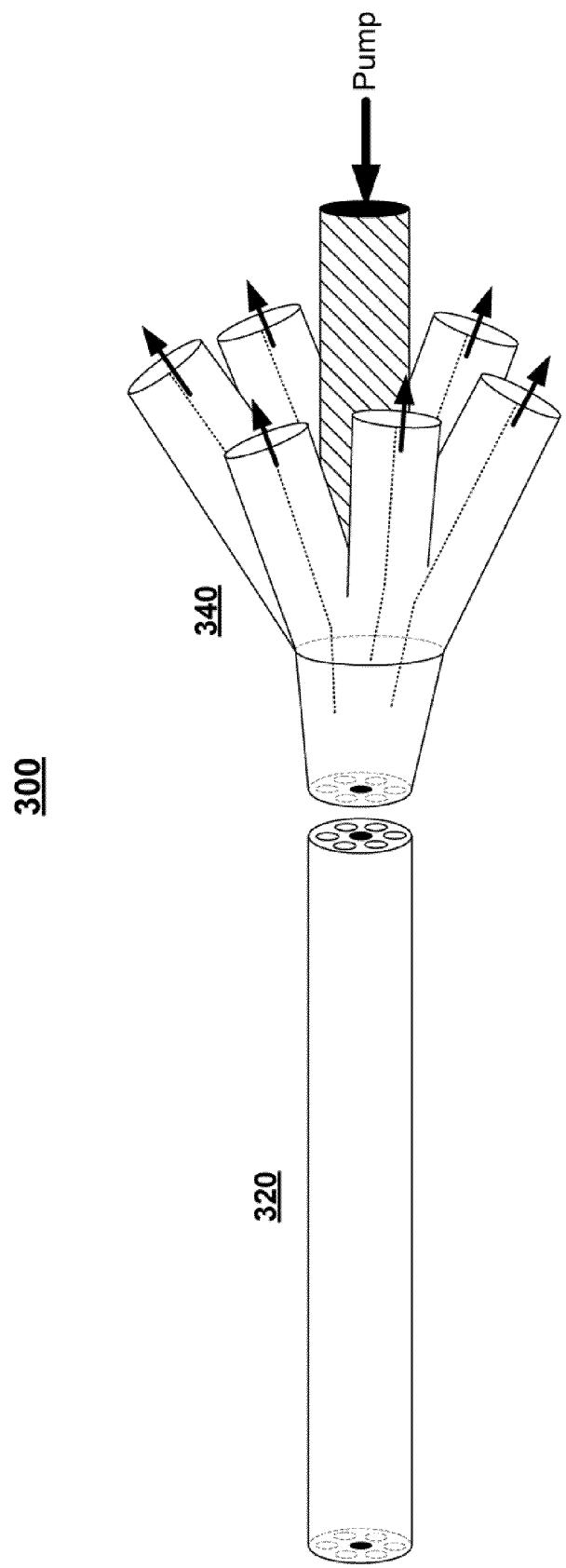

MULTICORE TRANSMISSION AND AMPLIFIER FIBERS AND SCHEMES FOR LAUNCHING PUMP LIGHT TO AMPLIFIER CORES

CROSS REFERENCE TO RELATED APPLICATIONS

The present application claims the priority benefit of the following United States provisional patent application, which is owned by the assignee of the present application, and which is incorporated herein by reference in its entirety:

U.S. Prov. Pat. App. Ser. No. 61/314,181, filed on Mar. 16, 2010.

BACKGROUND OF THE INVENTION

1. Field of the Invention

The present invention relates generally to the field of optical fiber transmission and amplification systems, and in particular, to improved multicore transmission and amplifier fibers and schemes for launching and controlling both signal and amplifier pump light.

2. Background Art

There is significant ongoing interest in the development of multicore optical fiber transmission systems. One technical issue that must be addressed, particularly for longer distance signal transport, is how best to provide amplification for multichannel transmissions carried by multicore fiber spans. Generally speaking, prior structures are unsuitable for use in such systems because of their unique geometry.

SUMMARY OF THE INVENTION

An aspect of the invention provides a transmission and amplification system that comprises a multichannel transmission span including a length of a multicore transmission fiber having a plurality of individual transmission cores. A first tapered multicore coupler provides connectivity between the plurality of transmission cores of the multicore fiber and a respective plurality of individual transmission leads. A fiber amplifier is provided having a plurality of individual cores including at least one pump core and a plurality of amplifier cores. A second tapered multicore coupler provides connectivity between the amplifier cores of the fiber amplifier and a respective plurality of amplifier leads, and between the at least one pump core and a respective pump lead. The plurality of individual transmission leads are connected to respective amplifier leads, such that individual cores of the multicore fiber are connected to respective amplifier cores of the fiber amplifier, and the pump lead is connected to a pumping light source. The fiber amplifier is configured to provide mode coupling between the at least one pump core and the amplifier cores, such that amplification is provided to respective light signals propagating through the amplifier cores.

BRIEF DESCRIPTION OF THE DRAWINGS

FIGS. 4A-4C are diagrams of three exemplary cross-sectional geometries for a multicore fiber amplifier according to a further aspect of the invention:

FIG. 5 shows an isometric view of a multicore fiber amplifier and an amplifier tapered multicore coupler according to a further aspect of the invention, wherein a section of the multicore amplifier is tapered to actuate mode coupling between the pump core and the amplifier cores.

FIGS. 9A and 9B are tables setting forth exemplary values for the refractive index profiles shown in FIGS. 7A-7B and 8A-8B.

FIG. 12 shows a diagram of an output end of an example of a backward-pumped fiber amplifier system according to a further aspect of the invention.

DETAILED DESCRIPTION

Optical transmission spans employing multicore fibers are described, for example, in U.S. patent application Ser. Nos. 13/044,859 and 13/045,064, which are owned by the assignee of the present application, and which are incorporated herein by reference in their entirety.

A long-distance transmission span may have a length of hundreds, or even thousands, of kilometers. In order to maintain an acceptable signal level over these distances, it is necessary to periodically amplify the transmitted light. Amplification is typically accomplished by connecting amplifiers into the transmission span at suitable intervals, e.g., every 50 to 100 km.

As described below in greater detail, an aspect of the invention provides a multicore fiber amplifier for use in a multicore fiber transmission span. A further aspect of the invention is directed to structures and techniques for providing core-to-core connectivity between the multicore fiber amplifier and a multicore transmission fiber, as well as connectivity between the multicore fiber amplifier and a pumping light source.

The present description is organized as follows:
1. System Overview
2. Providing Connectivity between MCF Transmission Fiber and Amplifier
3. Cross-Sectional Geometries for Multicore Fiber Amplifier
4. Coupling between Pump Core and Amplifier Cores
5. Index Profiles and Spacing of Pump Core and Amplifier Cores
6. Backward Pumping
7. Additional Applications
8. Conclusion

1. System Overview

Figure 1:
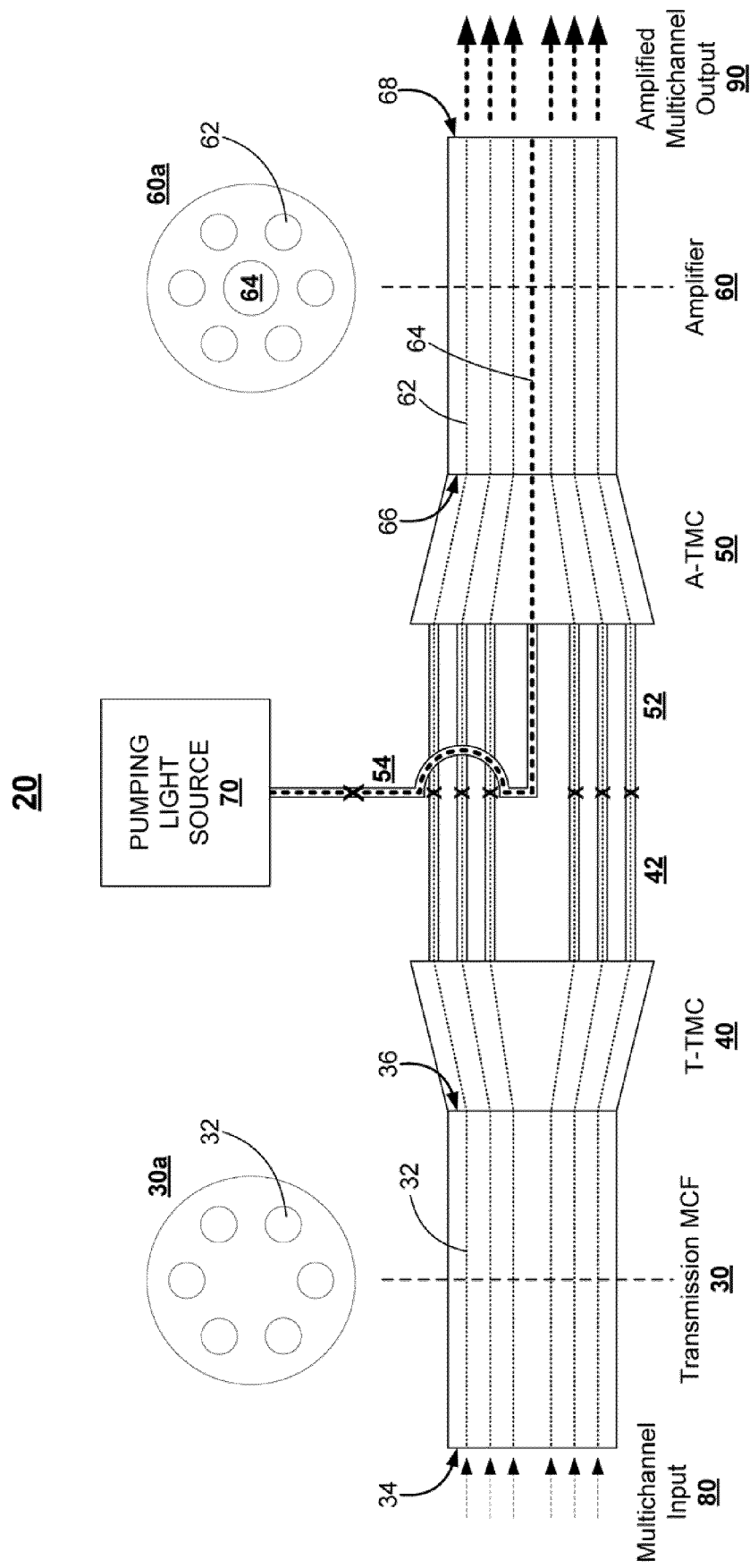
FIG. 1 shows a simplified diagram of a transmission and amplification system according to an aspect of the invention.

FIG. 1 shows a simplified diagram, not drawn to scale, of a transmission and amplification system 20 according to an aspect of the invention. System 20 comprises the following components: a transmission multicore fiber (MCF) 30, a transmission tapered mode coupler (T-TMC) 40, an amplifier tapered mode coupler (A-TMC) 50, a fiber amplifier 60, and a pumping light source 70. These components combine to receive a multichannel light input 80, and generate therefrom an amplified multichannel output 90.

In the present example, MCF 30 comprises a 6-core multicore fiber. An exemplary configuration of the MCF cores 32 is illustrated in inset 30*a*. The MCF cores may be single-mode cores or multimode cores. In a practice of the invention, MCF 30 is included as a component in a 6-channel transmission span in an optical core network, or the like.

Amplifier 60 comprises an amplifier fiber with seven cores. An exemplary configuration of the amplifier cores is illustrated in inset 60*a*. Six amplifier cores 62 correspond to respective individual cores 32 of MCF 30 and may be single-mode cores or multimode cores. In addition, fiber amplifier 60 includes a central pump core 64 that is used to transmit a pumping light from pumping light source 70. The fiber amplifier is doped to provide amplification by causing energy to be transferred from the pumping light to signal light, within an amplification window of operating wavelengths.

T-TMC 40 provides connectivity between the individual cores of the transmission MCF and a plurality of corresponding fiber leads 42, referred to herein as "transmission leads." The second type of tapered multicore coupler is referred to herein as an "amplifier tapered multicore coupler" (A-TMC), and provides connectivity between the individual cores of the amplifier and a plurality of corresponding fiber leads 52, 54. The leads to the amplifier cores are referred to herein as "amplifier leads" 52, and the lead to the pump core is referred to herein as a "pump lead" 54.

For the purposes of the present description, the multicore transmission fiber and amplifier are described as each having a tail endface 34, 66 and a lead endface 36, 68, with transmitted light signals propagating from each device's tail endface 34, 66 toward its lead endface 36, 68. In the presented drawings, the light signals propagate in a left-to-right direction.

As shown in FIG. 1, the T-TMC transmission leads 42 are connected to the A-TMC amplifier leads 52. In addition, the A-TMC pump lead 54 is connected to pumping light source 70.

In operation, the tail endface 34 of the transmission multicore fiber 30 is connected to a plurality of transmitters, or like transmission devices, with the individual cores of the multicore transmission fiber connected to respective transmission devices. Outputs from the plurality of transmission devices are provided as multichannel parallel inputs into the transmission MCF 30.

Light propagates down the length of system 20 in a plurality of parallel paths defined by MCF 30, T-TMC 40, transmission leads 42, amplifier leads 52, A-TMC 50, and amplifier 60. The amplifier pump core receives pumping light from source 70, resulting in amplified multichannel output 90.

System 20 may include additional components (not shown) in accordance with known practices in the art. Such additional components may include, for example, filters, optical isolators, and the like, and which may be implemented using gratings, wavelength division multiplexers (WDMs), and like structures.

With respect to system 20, shown in FIG. 1, it should be noted that current coupler methods would require the use of six standard pump-signal wavelength division multiplexers (WDMs) and six individual pumps. By employing aspects of the present invention, as described herein, it is possible to replace the six WDMs and pumps with a single A-TMC 50.

The above components, and additional aspects thereof, are described in detail below.

2. Providing Connectivity Between MCF Transmission Fiber and Amplifier

Figure 2:
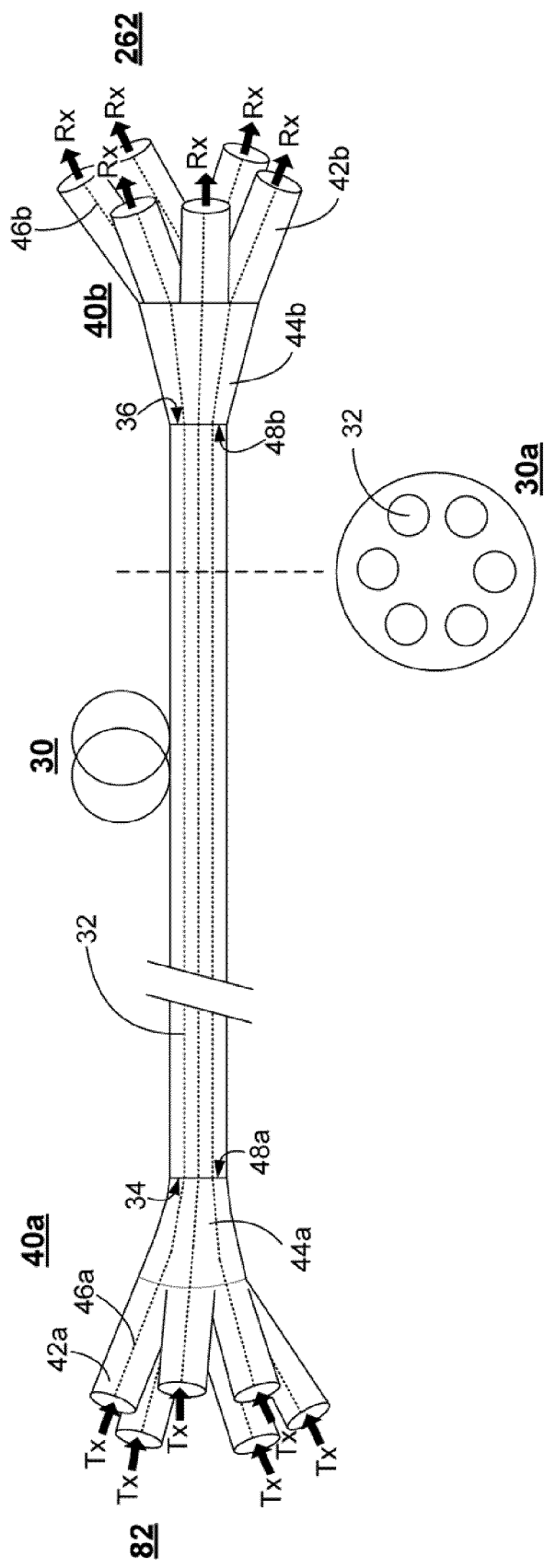
FIGS. 2 and 3 show isometric views of structures used to provide connectivity to the cores of the transmission multicore fiber and fiber amplifier shown in FIG. 1.
Figure 3:
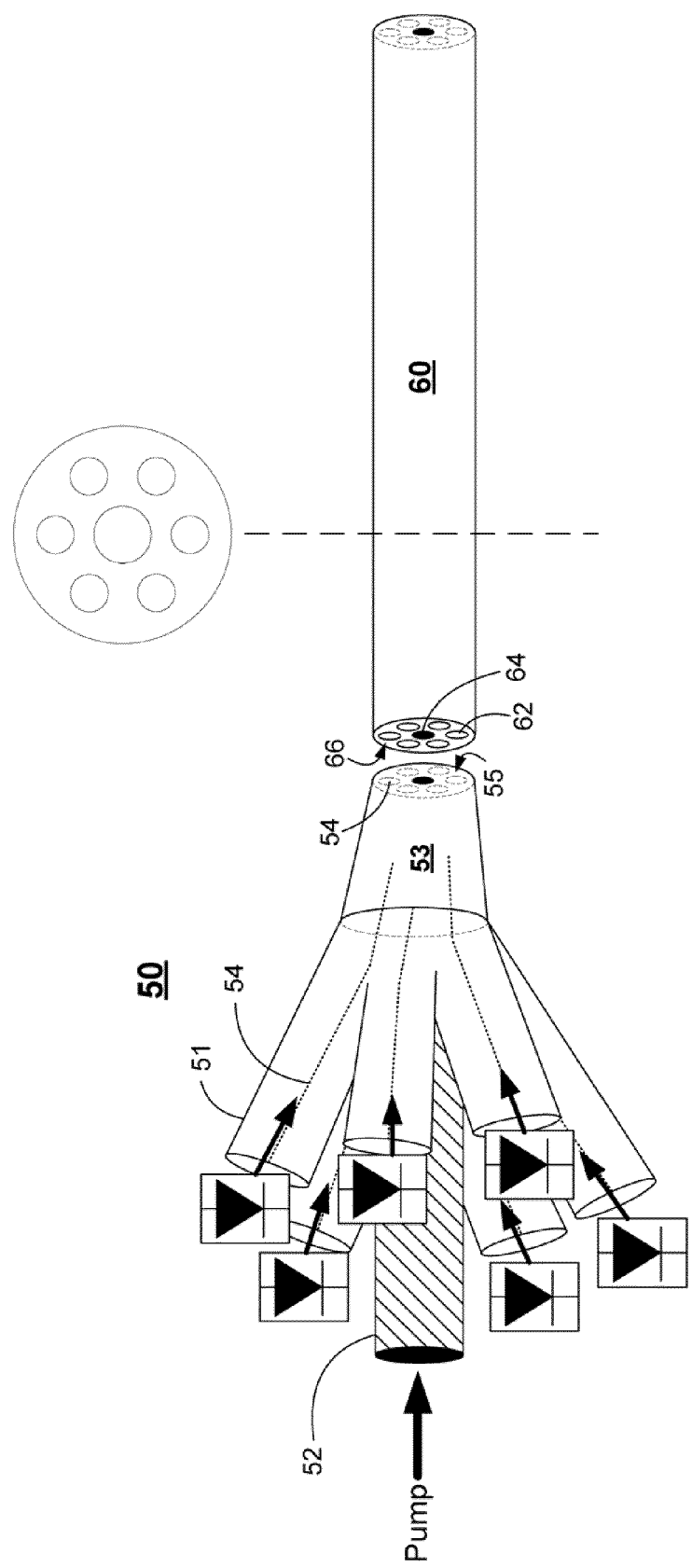

FIGS. 2 and 3 show isometric views of structures used to provide connectivity to the cores of transmission MCF 30 and fiber amplifier 60 in the system 20 shown in FIG. 1.

As shown in FIG. 2, in the present example, a first T-TMC 40*a* is used to provide connectivity to the cores of transmission MCF 30 at its tail endface 34, and a second T-TMC 40*b* is used to provide connectivity to the cores of transmission MCF 30 at its lead endface 36.

The first T-TMC 40*a* is used to provide connectivity between individual cores 32 of the transmission MCF and a respective plurality of transmitters 82, or like transmission devices. Other techniques may be used to provide such connectivity. For example, a coupling technique is described in U.S. Prov. Pat. App. Ser. No. 61/314,183, which is owned by the assignee of the present application, and which is incorporated herein by reference in its entirety. In that technique, an MCF is butt-coupled directly onto an array of vertical-cavity surface-emitting lasers (VCSELs), or like devices. The second T-TMC 40*b* is used to provide connectivity between individual cores 32 of the transmission MCF and amplifier 60.

As illustrated in FIG. 2, a T-TMC comprises a plurality of individual transmission leads 42*a*, 42*b* that are joined together at a coupler body 44*a*, 44*b* that preserves the separation of the respective cores 46*a*, 46*b* of the transmission leads 42*a*, 42*b*. The cores extend through the coupler body and terminate at a junction endface 46*a*, 46*b*. The configuration of the cores at the junction endface 48*a*, 48*b* matches that at the MCF endfaces 34, 36. Thus, the junction endfaces 48*a*, 48*b* can be connected directly to the MCF endfaces 34, 36, with each of the individual MCF cores 32 aligned with a respective core of a transmission lead 42*a*, 42*b*. Techniques for designing and fabricating tapered multicore couplers are described in U.S. Prov. Pat. App. Ser. No. 61/314,182, which is owned by the assignee of the present application, and which is incorporated herein by reference in its entirety. Suitable means for identifying the individual cores or the orientation of the cores at endfaces 34, 36, can be provided as features in the MCF construction or MCF design. These can include geometrical features, inclusions such as airholes or other doped glass regions with fluorescence upon appropriate excitation, or marker on clad surfaces or the like. Geometrical features are described, for example, in U.S. Prov. Pat. App. Ser. No. 61/314,165, which is owned by the assignee of the present application, and which is incorporated herein by reference in its entirety.

FIG. 3 is an isometric view of A-TMC 50, which is used to provide connectivity to 7-core MCF amplifier 60. In MCF amplifier 60, six cores are amplifier cores 62, such as rare earth-doped cores (e.g., cores doped with Er or Er/Yb), Raman amplifier cores, or parametric amplifier cores, corresponding to the six individual cores 32 of the MCF transmission fiber 30. The seventh core 64 is a pump core, which is used to carry a pump light. In the exemplary fiber amplifier, the seven cores 62, 64 are arranged in a hexagonal array, with the amplifier cores 62 located at the vertices of the hexagon, and the pump core 64 located at the center of the hexagon. The length of the amplifier depends upon a number of considerations. In the present example, the amplifier is expected to have a length in the range of 5 m to 200 m. It will be appreciated that the amplifier may also be practiced with other types of configurations, including employing different geometries, dimensions, core dopants, numbers of cores, and the like.

As illustrated in FIG. 3, A-TMC 50 comprises a plurality of individual amplifier leads 51 and at least one pump lead 52 that are joined together at a tapered coupler body 53 that preserves the separation of the respective cores 54 of the leads 51, 52. The cores 54 extend through the coupler body 53 and terminate at a junction endface 55. The configuration of the cores at the junction endface 55 matches that of the amplifier cores 62, 64. Thus, the A-TMC endface 55 can be connected directly to the amplifier lead endface 66, with the individual amplifier cores 62, 64 aligned with respective cores 54 of the amplifier and pump leads 51, 52.

The leads from T-TMC 40b and A-TMC 50 are fanned out and connected as shown in FIG. 1. Each amplifier lead is connected to a respective transmission lead. The pump lead is connected to pumping light source 70.

According to a further practice of the invention, a bridge multicore fiber can be use to reduce the connection or splice loss between a multicore transmission fiber and multicore amplifier fiber, where there is a significant difference in their respective mode field diameters (MFDs).

For example, let us suppose that the cores in the transmission MCF have a modefield diameter $MFD_T=10$ μm, and that the cores in the amplifier MCF have a modefield diameter $MFD_A=5$ μm. If the transmission and amplifier MCFs are connected directly, the splice loss will be approximately 1.8 dB, calculated as follows:

$$\alpha_{SpliceTA} = 20 \cdot \log\left(\frac{MFD_T}{2 \cdot MFD_A} + \frac{MFD_A}{2 \cdot MFD_T}\right)$$

However, when a bridge MCF having a modefield diameter $MFD_B$, is used to make the intermediate connection between the transmission MCF and amplifier MCF, the total splice loss will be:

$$\alpha_{SpliceTBA} = 20 \cdot \log\left(\frac{MFD_T}{2 \cdot MFD_B} + \frac{MFD_B}{2 \cdot MFD_T}\right) + 20 \cdot \log\left(\frac{MFD_B}{2 \cdot MFD_A} + \frac{MFD_A}{2 \cdot MFD_B}\right)$$

When $MFD_B$ is chosen to have an intermediate value between $MFD_T$ and $MFD_A$, the net splice loss can be reduced. For example, when $MFD_B$ is chosen to be 7.1 μm, the total splice loss $\alpha_{SpliceTBA}$ will be approximately 1.0 dB, i.e., significantly smaller than $\alpha_{SpliceTA}=1.8$ dB, as above.

Furthermore, more than one bridge MCF can be used to further reduce the splice loss between the transmission and amplifier MCF. Additional methods for creating adiabatic transitions between fiber cores which support modes of different modefield diameter are well known, such as thermally-expanded cores, and physical tapering of the fiber and core diameter.

3. Possible Cross-Sectional Geometries of the Multicore Amplifier:

FIGS. 4A-4C are diagrams of three exemplary cross-sectional geometries for a multicore fiber amplifier.

In Designs A-C, each depicted amplifier 60a-c comprises six amplifier cores 62a-c and surrounding clads 63a-c positioned at the vertices of a regular hexagon. The amplifier cores 62a-c are doped with a suitable rare earth dopant, or like material, such that each amplifier core comprises an active gain medium.

Each amplifier 60a-c further comprises a pump core 64a-c and surrounding clad 65a-c positioned at the center of the amplifier cores 62a-c.

The design parameters include the following:
the pump clad diameter $D_{pclad}$;
the amplifier clad diameter $D_{aclad}$;
the ratio R between the pump clad diameter $D_{pclad}$ and the amplifier clad diameter $D_{aclad}$;
the center-to-center distance $D_{p-a}$ between the pump core and each amplifier core (assumed to be equal for all amplifier cores in the depicted designs); and
the center-to-center distance $D_{a-a}$ between adjacent amplifier cores (assumed to be equal for all pairs of adjacent amplifier cores in the depicted designs).

Design A (shown in FIG. 4A): All 7 cores have the same clad diameter. In addition, the center-to-center spacing between adjacent amplifier cores and between pump and amplifier cores is the same as the clad diameter, i.e., $$D_{a-a}=D_{p-a}=D_{pclad}=D_{aclad}$$

Design B (shown in FIG. 4B): The pump clad diameter $D_{pclad}$ is R times the amplifier clad diameter $D_{aclad}$. The center-to-center distance Dp-a between the pump core and the amplifier cores, and the center-to-center distance Da-a between adjacent amplifier cores are both equal to (R+1)D/2. Thus, $$D_{pclad}=R \cdot D_{aclad}$$

and $$D_{a-a}=D_{p-a}=(R+1) \cdot D_{aclad}/2.$$

Design C (shown in FIG. 4C): The amplifier cores 62c and claddings 63c are at least partially embedded within the pump cladding 65c. A preform for Design C can be fabricated in a number of ways. For example, it would be possible to form a pump core-and-clad rod by collapsing a clad tube around a suitably doped core material. Amplifier cores are then embedded into the pump clad by grinding suitably shaped grooves into the outer perimeter of the pump core-and-clad rod. The resulting assembly is then collapsed and drawn into fiber.

4. Coupling Between Pump and Rare-Earth-Doped Cores:

FIG. 5 shows an isometric view of a multicore fiber amplifier 160 and an A-TMC 150 according to a further aspect of the invention, wherein a section of the multicore amplifier 161 is tapered to actuate mode coupling between the pump light in the center core and the six surrounding amplifier cores. Specifically, a short section of the multicore amplifier fiber, typically having a length of approximately 10 mm to 50 mm, is tapered to reduce the core and clad diameters such that the pump light will be readily coupled into the amplifier cores.

5. Index Profiles and Spacing of Pump and Amplifier Cores:

Since the transmission signals propagate in the cores of the fiber amplifier, it is important to maintain low crosstalk among the amplifier cores. Furthermore, the amplifier cores should have a high core index and small effective area that are required for high pump efficiency and a large gain coefficient.

Modefield diameter (MFD) is a useful indicator with respect to the amount of expected crosstalk between adjacent cores in a crosstalk fiber. Thus, according to an aspect of the invention, the amplifier cores and the pump core are configured to have a modefield diameter resulting in an acceptably low level of crosstalk at a given operating wavelength. The amount of acceptable crosstalk depends upon the particular application. Generally speaking, a crosstalk level on the order of −20 dB may be workable, although −40 dB may be more desirable.

Further, the amplifier cores and the pump cores are configured to have respective index differences and diameters that result in a modefield diameter that is maintained over a selected tapering ratio, e.g., 1:2.

(a) Amplifier Core Index Profile

Figure 6:
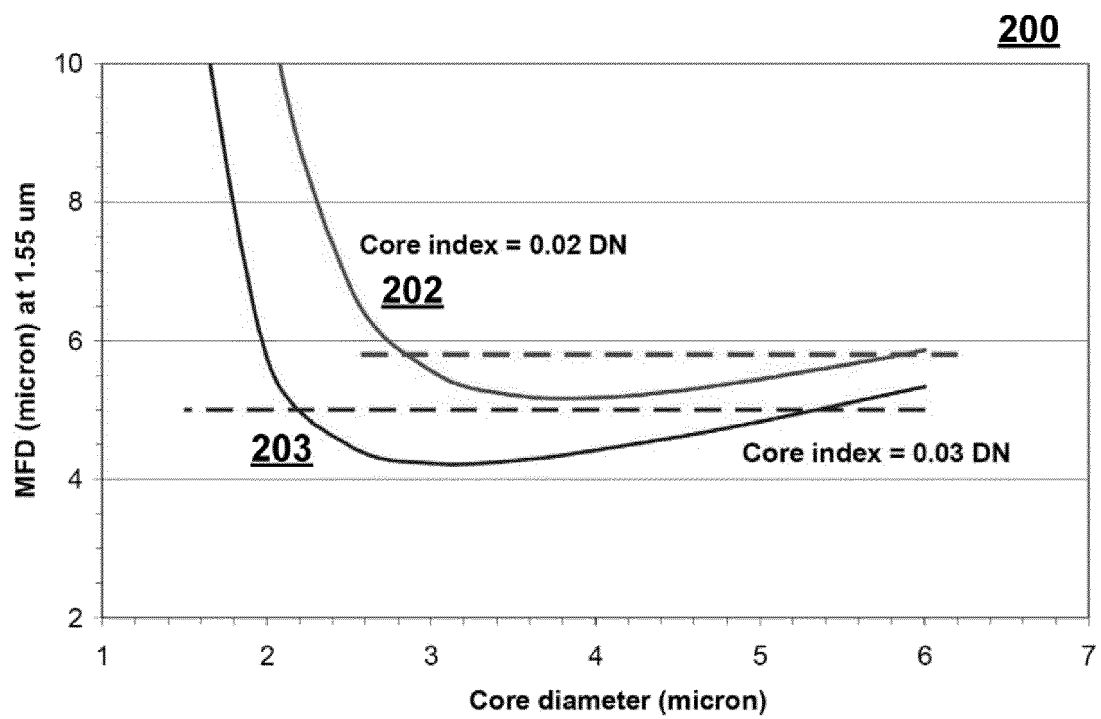
FIG. 6 is a graph showing the relationship between mode-field diameter and core diameter.

FIG. 6 is a graph 200 showing the relationship between modefield diameter and core diameter. The upper curve 202 corresponds to $\Delta n=0.02$ and the lower curve 203 corresponds to $\Delta n=0.03$. As used herein, the term $\Delta n$ refers to the refractive index difference, i.e., the difference in the refractive index for a given core region and the refractive index for the cladding material. From FIG. 5, it can be seen that a core diameter can be chosen such that the modefield diameter (MFD) remains unchanged, within a tolerance range, even after a relatively large fractional change in the core diameter.

As shown by curve 203, for $\Delta n=0.03$ the MFD at 1550 nm remains between 4.1 µm and 5 µm when the core diameter is reduced >50% from 5.3 µm to 2.2 µm. Similarly, as shown by curve 202, when the diameter of $\Delta n=0.02$ core is reduced from 6 µm to 2.8 µm, the MFD remains between 5.2 µm and 5.8 µm. This analysis indicates that the high-index amplifier core can be tapered 50% without a significant change in MFD. Thus, FIG. 5 indicates that fiber diameter tapering will not significantly increase the crosstalk among amplifier cores.

(b) Pump Core Index Profile

In designing the pump core index profile, it is desirable to have effective coupling between the amplifier cores and the pump core. According to an aspect of the invention, the degree of coupling is controlled by diameter tapering.

Figure 7A:
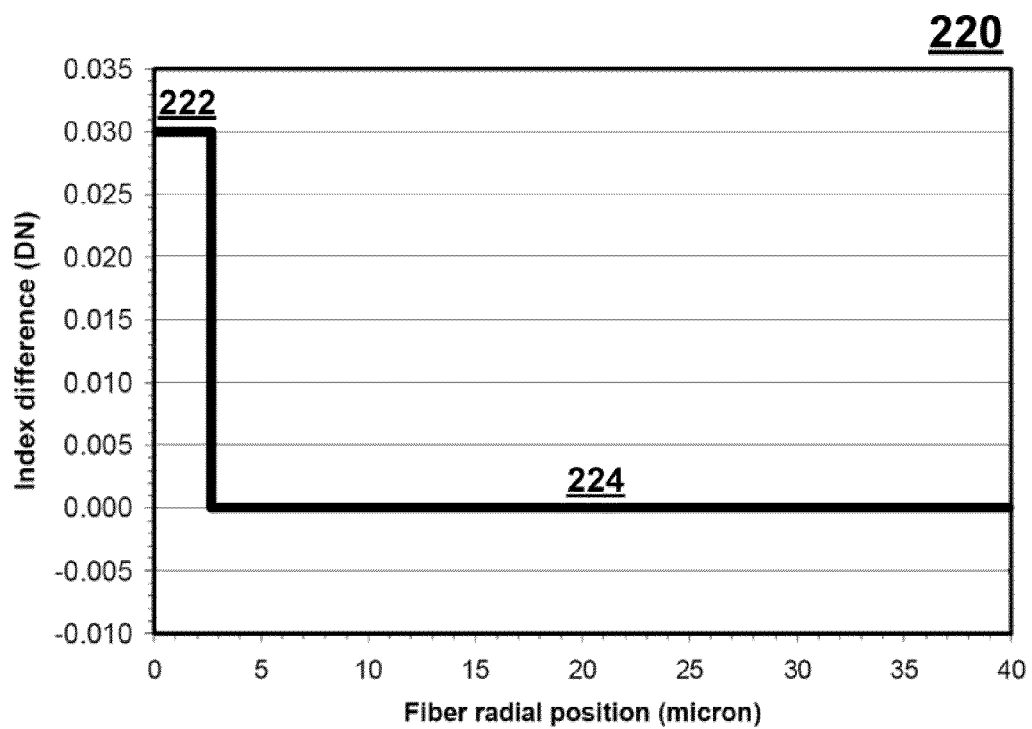
FIGS. 7A and 7B show respective refractive index profiles for an amplifier core and cladding according to an aspect of the present invention, before and after tapering.
Figure 7B:
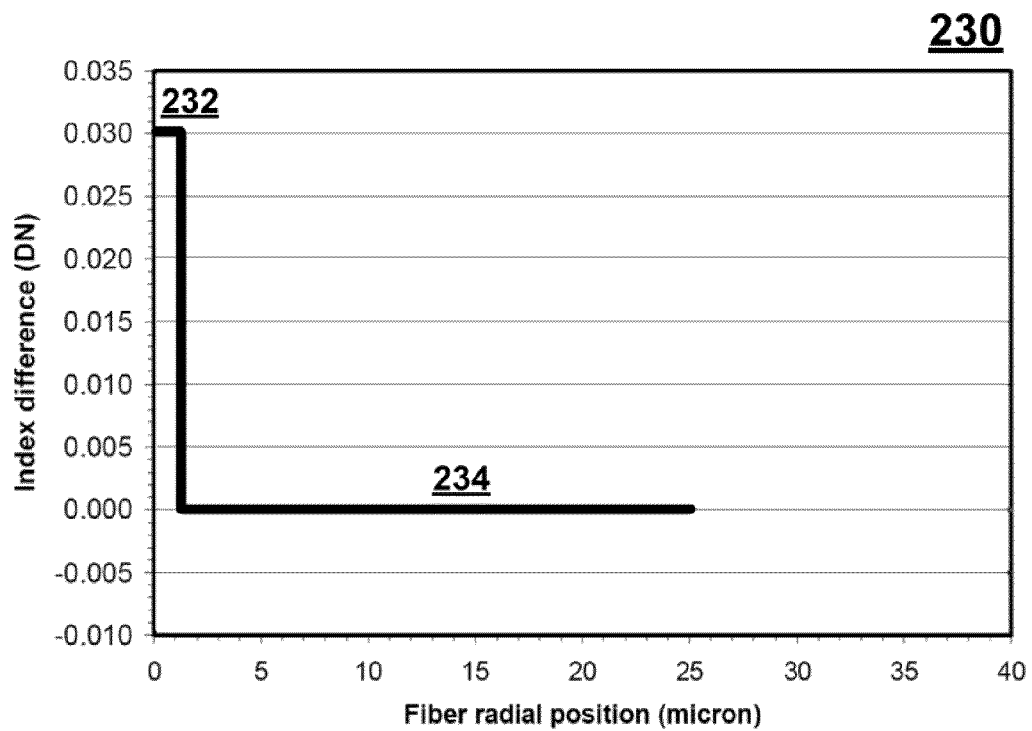

FIGS. 7A and 7B show respective refractive index profiles 220, 230 for an amplifier core according to an aspect of the present invention, before and after tapering. The profile includes a central core region 222, 232 and an outer cladding region 224, 234. Exemplary values for the refractive index difference $\Delta n$ and outer radius r for the amplifier core 222, 232 and cladding 244, 234, before and after tapering, are set forth in Table 1, shown in FIG. 9A.

In the present example, the tapering ratio used is 1:2. Thus, the radius of the amplifier cores is chosen so as to maintain a constant modefield diameter, within a tolerance, before and after tapering. In the present example, the amplifier core radius is chosen to be ~2.8 µm prior to tapering, and ~1.4 µm after tapering.

Figure 8A:
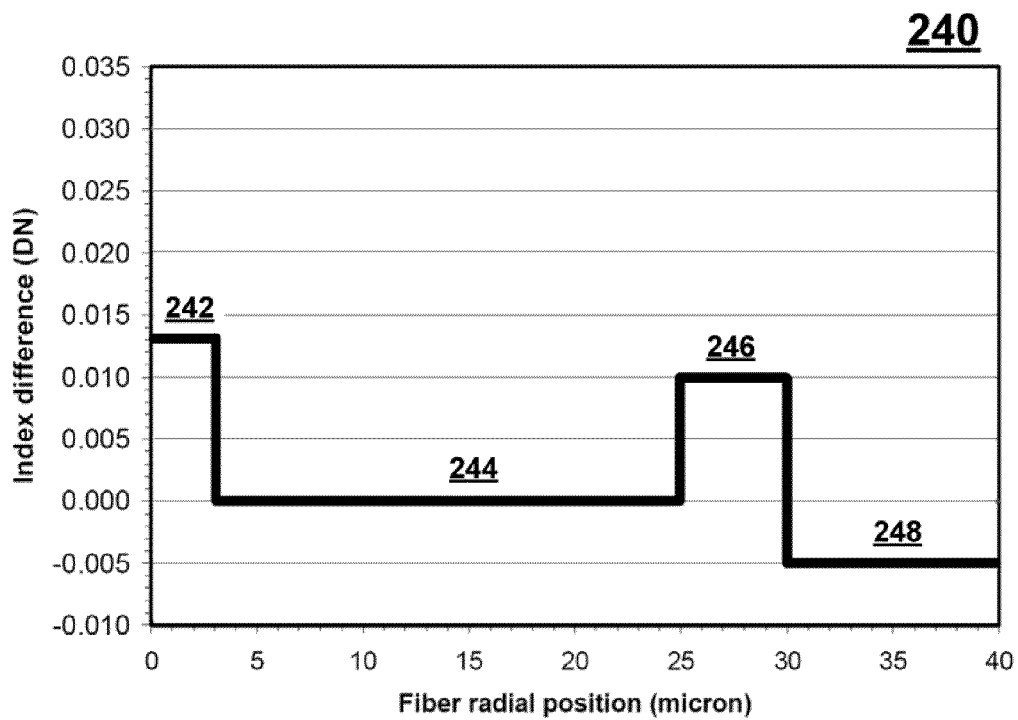
FIGS. 8A and 8B show respective refractive index profiles for a pump core and cladding according to the present invention, before and after tapering.
Figure 8B:
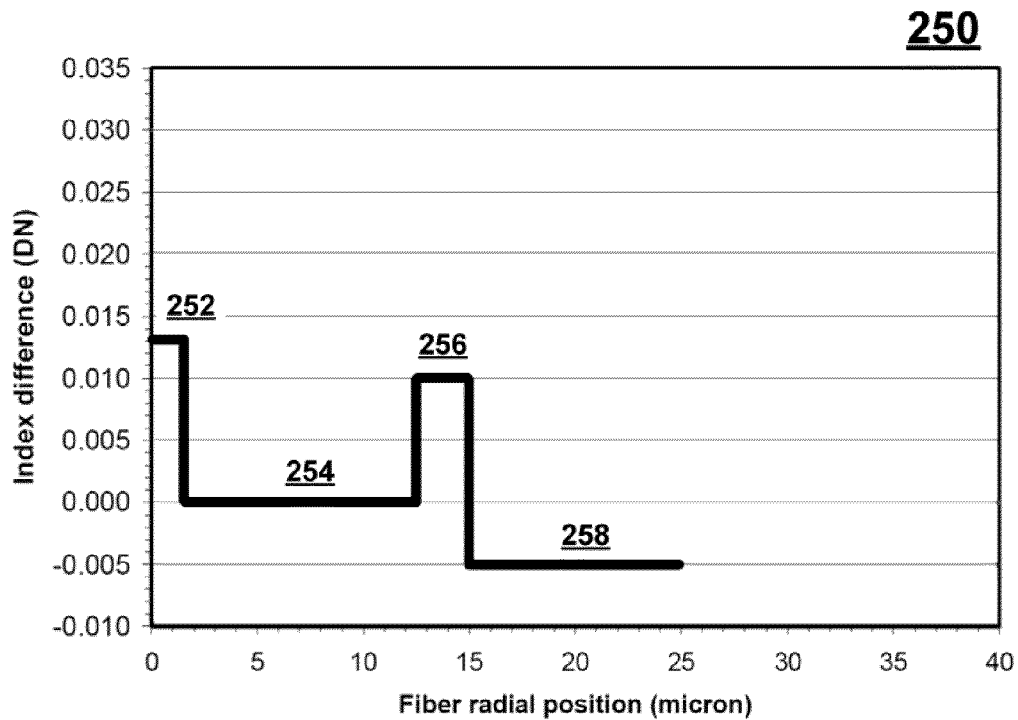

FIGS. 8A and 8B show respective refractive index profiles 240, 250 for a pump core according to the present invention, before and after tapering. The profile includes a central core region 242, 252, a pedestal region 244, 254 surrounding the core region 242, 252; a ring region 246, 256 at the outer edge of the pedestal 244, 254; and a depressed outer region 248, 258 surrounding the ring 246, 256. Exemplary values for the refractive index difference $\Delta n$ and outer radius r for the pump core 242, 252, pedestal 244, 254, ring 246, 256, and depressed outer region 248, 258, before and after tapering, are set forth in Table 2, shown in FIG. 9B. The ring 246, 256 serves to increase power distribution at large radial positions and to enhance mode coupling with the amplifier cores upon tapering.

Figure 10:
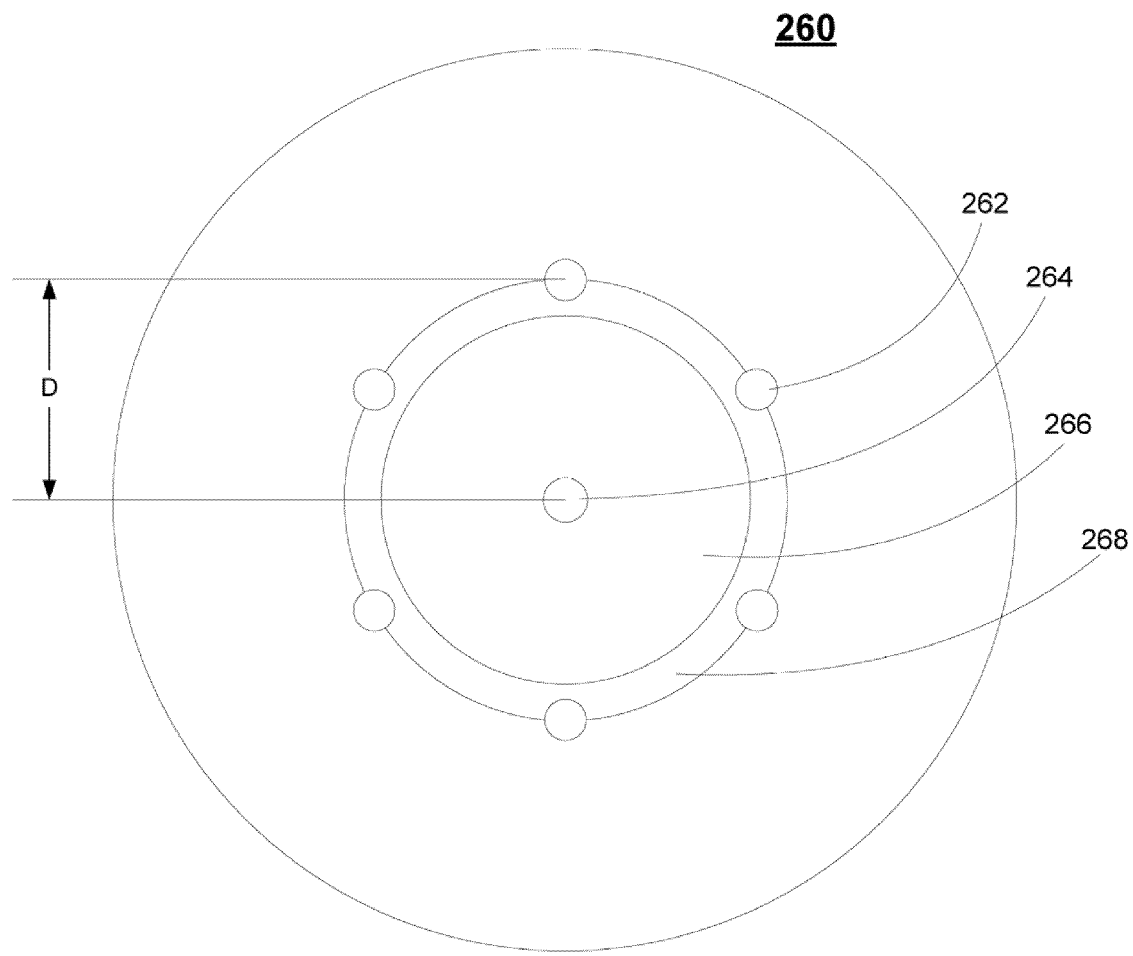
FIG. 10 shows an exemplary core configuration for a fiber amplifier according to a further aspect of the invention.

(c) Exemplary Index Profiles and Core Spacing:

FIG. 10 shows an exemplary configuration for an amplifier 260. In the depicted example, the amplifier cores 262 are located at evenly distributed angular positions around the pump core 264. The center-to-center spacing D is 30 µm between the pump and amplifier cores. The spacing is also 30 µm between adjacent amplifier cores in this example.

Further shown in FIG. 10 are the pump pedestal 266 and ring 268. The amplifier cores 262 are at least partially embedded in ring 268.

(d) Expected Power Distribution

OFS proprietary software was used to calculate the expected waveguide properties and optical power distributions for the amplifier and pump cores based on the above exemplary index profiles.

Figure 11A:
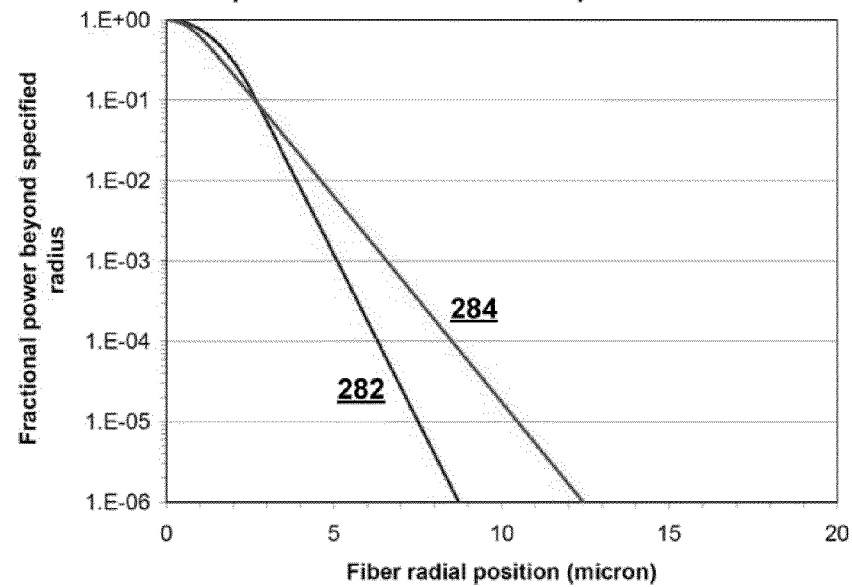
FIG. 11A is a graph showing the fractional power at 1550 nm located outside specified fiber radial positions from the center of an amplifier core.

FIG. 11A is a graph 280 that shows the fractional power at 1500 nm located outside specified fiber radial positions from the center of an amplifier core. Curve 282 corresponds to the untapered amplifier core, and curve 284 corresponds to the 50% tapered amplifier core.

The center-to-center spacing between adjacent amplifier cores in the untapered fiber is 30 µm, and 15 µm in the tapered fiber. From curve 284, it can be seen that for the 50% tapered amplifier core, there is expected to be approximately $5.1 \times 10^{-8}$ optical power located outside of a 15 µm fiber radial position. This suggests that crosstalk is less than −70 dB between adjacent amplifier cores.

Figure 11B:
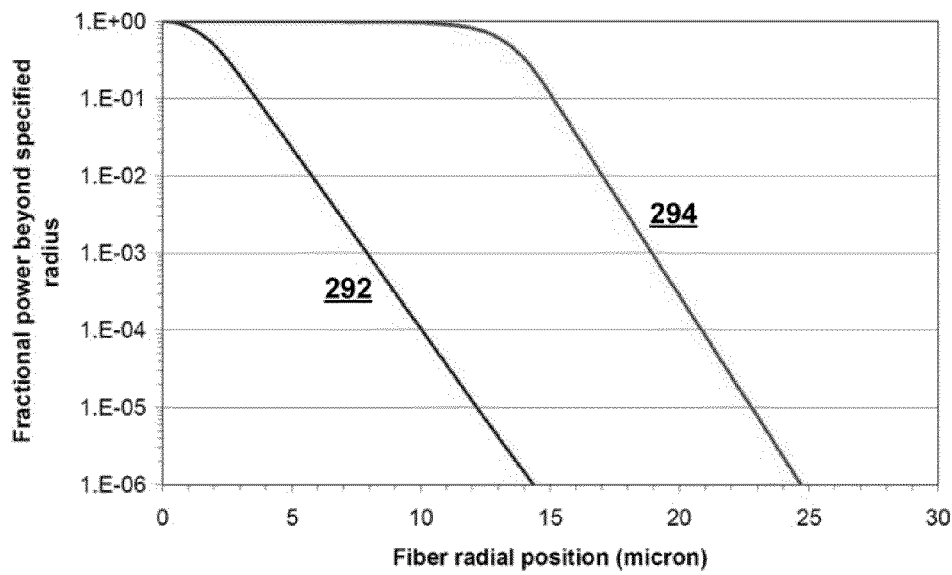
FIG. 11B is a graph showing the fractional power at 1550 nm located outside the specified radial position from the center of a pump core.

FIG. 11B is a graph 290 that shows the fractional power at 1550 nm located outside the specified radial position from the pump core center. Curve 292 corresponds to the untapered pump core, and curve 294 corresponds to the 50% tapered pump core.

The Center-to-center spacing between amplifier cores in the untapered fiber is 30 µm, and 15 µm in the tapered fiber. From curve 284, it can be seen that for the 50% tapered amplifier core, there is expected to be approximately $5.1 \times 10^{-8}$ optical power located outside of a 15 µm fiber radial position. This suggests that crosstalk is less than −70 dB between adjacent amplifier cores.

The center-to-center spacing between the pump core and the amplifier cores in the untapered fiber is 30 µm. From curve 292, it can be seen that for the untapered pump core there is approximately $3.0 \times 10^{-9}$ optical power located beyond 30 µm from the pump core center. This suggests that there will be little mode coupling between the pump and amplifier cores in the untapered fiber.

Upon tapering, the center-to-center spacing between the pump core and the amplifier cores is 15 µm. From curve 294, it can be seen that for the tapered pump core there is approximately $1.2 \times 10^{-1}$ optical power located beyond 15 µm from the pump core center. This suggests that a significant fraction (e.g., −17 dB) of the peak pump power can be launched into each of the six amplifier cores.

FIG. 11B shows fractional optical power at 1550 nm located beyond the specified radial position from the pump core center. When the tapered amplifier core center is located at 15 µm from the pump core center, as shown in FIG. 10, about 12.05% optical power will be coupled to the amplifier core. This suggests −17 dB of the peak pump power will be launched into each of the six amplifier cores. It is noted that the finite diameter of the amplifier cores must be taken into account. At a radius of 15 µm, some of the pump light falls between cores.

When the amplifier cores are placed closer to the central pump core, e.g., using Design C shown in FIG. 4C, the amplifier cores can receive a much higher pump power.

For example, about −8.7 dB of the peak pump power will be launched to each of the 6 amplifier cores that are located 12 µm from the pump core center in a 50% tapered fiber. This pump power is about 0.93 dB or 19% less than the theoretical limit in this shared pumping configuration. This is because the pump power is shared by six amplifier cores. Thus, at most −7.8 dB of the peak pump power can be launched to each amplifier core.

6. Backward Pumping

In the fiber amplifiers discussed above, pumping light is provided to the amplifier from its input end. It is also possible for the pumping light to be provided from the amplifier's output end, using a backward pumping configuration.

FIG. 12 shows a diagram of an output end of an example of a backward-pumped fiber amplifier system 300 according to a further aspect of the invention. The amplifier body comprises a 7-core amplifier fiber 320, corresponding to amplifier fiber 60, discussed above.

An A-TMC 340 is connected to an output endface of the amplifier fiber. The structure of the A-TMC 340 corresponds to the A-TMC 50, discussed above. A-TMC 340 provides connectivity for a pump input into the amplifier pump core, and connectivity for the six amplifier core outputs. Thus, in the depicted system, the pump light is launched from right to left, and the amplified signal light propagates from left to right.

In a further aspect of the invention, a portion of the amplifier fiber is tapered, in accordance with the above-described techniques, to facilitate coupling between the pump core and the amplifier cores.

It will be appreciated that the above-described backward-pumped amplifier system and techniques can be practiced with various other types of fibers, including those with different numbers and configurations of amplifier and pump cores. The TMC devices can be used in pairs connected by leads, as shown in FIG. 1, or can be combined with free-space couplers or imaging devices.

The center core at the MCF amplifier can be used to pump the other 6 amplifier cores at different pump wavelengths, e.g. 980 nm and 1480 nm for erbium-doped amplifier cores or pump wavelengths at one Stokes wavelength below the target amplification wavelength in multicore Raman amplifiers.

Broadband amplification is achieved by choosing appropriate dopant compositions in the amplifier cores as known in prior arts of rare-earth fiber amplifiers and Raman amplifiers.

Aspects from other amplifier systems described herein may be incorporated into amplifier system 300, with modification, as required; in addition, aspects of amplifier system 300 may be the subject of further development. These aspects include, for example, pump-mediated crosstalk and control of gain and transients.

7. Additional MCF Applications

According to further aspects of the invention, the above-described structures and techniques may be modified and expanded for application in a number of different applications and contexts. Some of these applications and contexts are set forth hereinbelow.

(a) Multicore Erbium-Ytterbium Co-Doped Amplifier

According to this aspect of the invention, a multicore fiber is drawn from a preform that includes erbium-ytterbium co-doped core rods of the type currently used in 980 nm applications. The multicore fiber is then used to construct a fiber amplifier, in accordance with the above techniques.

An erbium-ytterbium multicore amplifier according to this aspect of the invention is likely to have a higher gain coefficient, but a narrower gain spectrum, than that of an erbium-doped multicore amplifier. It is expected that a high-power pump source with wavelength in the range 900 nm to 980 nm is more readily available than a high-power 1480 nm source, although either source is suitable.

(b) Cladding-Pumped Configuration

The multicore fiber containing rare-earth-doped cores can be configured for cladding-pumped configuration. This can include use of dopants providing higher bulk absorption rates (including Er-Yb doping discussed above), as well as features for avoiding low-absorption pump modes (including use of a non-circular pump guide, star-shaping, "mode-mixing," and air-clad structures). Cladding pumped fiber may be drawn with a low-index coating to guide pump light in the cladding, or a double-clad structure (including air-clad) to guide pump light in the inner cladding. According to this aspect of the invention, the multicore fibers are constructed to have seven rare-earth-containing cores. The potential advantage of a cladding-pumped arrangement is that any number of cores or placement of cores is compatible with pump absorption in all cores. The erbium-ytterbium concentrations and index profiles at the inner and outer cores are designed to achieve a uniform gain to account for radial distribution of the clad-pump power.

Further, the area ratio (i.e., pump-guided area/absorbing area) can be made low to allow an Er-only clad-pumped fiber.

(c) Tapered Fiber Bundle

A further aspect of the invention provides a multicore fiber amplification system, in which a 19-core fiber amplifier is used to provide amplification to a multichannel parallel transmission carried by a 7-core multicore fiber span.

Two types of tapered fiber bundles (TFBs) provide connectivity. The first type of TFB is a Type A TFB that has seven fiber leads and respective cores for providing connectivity for each of the seven individual cores of the multicore fiber span. The second type of TFB is a Type B TFB that has nineteen fiber leads and respective cores. Seven of these leads are connected to respective fiber leads of a Type A TFB, and provide connectivity between the seven individual cores of the multicore fiber span and the seven rare-earth-doped amplifier cores. The remaining twelve leads are used to launch the 908 nm pump power to the cladding region in the multicore amplifier.

The above-described variations in the structure and practice of the earlier described fiber amplifiers may also be used in conjunction with this latest aspect of the invention. These variations include, for example, the use of a tapered portion in the amplifier, the use of a backward pumping configuration, and the like.

(d) Multicore Dispersion Compensating Fiber

According to a further aspect of the invention, the above-described structures and techniques are adaptable for use with a multicore dispersion compensating fiber (DCF). It should be noted that a multicore DCF typically has a relatively long fiber length. The individual cores of the multicore DCF would provide properties similar to conventional single-core DCF, namely control of dispersion, dispersion slope, macrobend and microbend loss, modefield area and spliceability.

8. Conclusion

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

The invention claimed is:

1. A transmission and amplification system, comprising:
   a multichannel transmission span including a length of a multicore transmission fiber having a plurality of individual transmission cores;
   a first tapered multicore coupler for providing connectivity between the plurality of transmission cores of the multicore fiber and a respective plurality of individual transmission leads;

a fiber amplifier having a plurality of individual cores including at least one pump core and a plurality of amplifier cores; and a second tapered multicore coupler for providing connectivity between the amplifier cores of the fiber amplifier and a respective plurality of amplifier leads, and between the at least one pump core and a respective pump lead, wherein the plurality of individual transmission leads are connected to respective amplifier leads, such that individual cores of the transmission multicore fiber are connected to respective amplifier cores of the fiber amplifier, and wherein the pump lead is connected to a pumping light source, and wherein the fiber amplifier is configured to provide mode coupling between the at least one pump core and the amplifier cores, such that amplification is provided to respective light signals propagating through the amplifier cores.

2. The transmission and amplification system of claim 1,
wherein the multicore transmission fiber has an tail endface and a lead endface,
wherein the lead end the of the multicore transmission fiber is connected to a junction endface of the first tapered multicore coupler, and
wherein the tail endface of the multicore transmission fiber is connected to a plurality of transmission devices, wherein the individual transmission cores are connected to respective transmission devices.

3. The transmission and amplification system of claim 1,
further including a third tapered multicore coupler for providing connectivity between the individual transmission cores and the respective transmission devices.

4. The transmission and amplification system of claim 1,
further including a bridge multicore fiber for providing connectivity between the individual transmission cores and the respective amplifier cores,
wherein the cores of the bridge multicore fiber have a modefield diameter between the modefield diameter of the cores in the transmission multicore fiber and the modefield diameter of the respective cores in the amplifier multicore fibers.

5. The transmission and amplification system of claim 1,
wherein the first tapered multicore fiber comprises a plurality of fiber leads joined together at a tapered coupler body,
wherein the plurality of fiber leads comprises a respective plurality of cores extending through the tapered coupler body to a junction endface, and
wherein the junction endface has an outer diameter and core configuration matching that of the multicore fiber lead endface, such that the junction endface and the multicore fiber lead endface are connectable to each other, with the individual cores of the multicore transmission fiber aligned with respective cores at the junction endface.

6. The transmission and amplification system of claim 5,
wherein the tapered multicore amplifier coupler comprises a plurality of amplifier fiber leads and at least one pump fiber lead joined together at a tapered coupler body,
wherein the plurality of fiber leads comprises a respective plurality of cores extending through the tapered coupler body to a junction endface, and
wherein the junction endface has an outer diameter and core configuration matching that of the fiber amplifier lead endface, such that the junction endface and the amplifier fiber lead endface are connectable to each other, with the individual cores of the fiber amplifier aligned with respective cores at the junction endface,
wherein the amplifier leads are connected to respective transmission fiber leads of the tapered multicore transmission coupler, and
wherein the at least one pump light lead is connected to the at least one pump lead.

7. A coupler comprising:
a fiber body; and
at least one first core and a plurality of second cores extending through the fiber both along its length,
wherein the at least one first core and the second cores are configured to provide mode coupling therebetween, such that a portion of the light transmitted through the at least one first core is transferred to one or more of the second cores,
wherein the second cores have a Raman gain coefficient that is sufficient to provide Raman amplification, and
wherein the pump core and the amplifier cores are surrounded by respective cladding regions with the fiber body.

8. The fiber amplifier of claim 7,
wherein the pump core and amplifier cores have respective cladding regions with the same outer diameter.

9. The fiber amplifier of claim 7,
wherein the pump cladding diameter is R times the amplifier clad diameter, D, and
wherein the spacing between the center core and the rare-earth doped core, and the spacing between adjacent rare-earth cores are both $(R+1)D/2$.

10. The fiber amplifier of claim 7, wherein the claddings of the amplifier are located within the cladding of the pump core.

11. The fiber of claim 7,
wherein a section of the fiber body is tapered to actuate mode coupling between the pump light in the center core and the surrounding amplifier cores.

12. The fiber claim 11,
wherein the amplifier cores are configured such that their respective modefield diameters remains constant as the amplifier is tapered, within a tolerance range.

13. The amplifier of claim 12, wherein the pump cladding includes a ring at its outer perimeter for enhancing mode coupling with the amplifier cores upon tapering.

14. A transmission and amplification system, comprising:
a multichannel transmission span including a length of a multicore transmission fiber having a plurality of individual transmission cores;
as first tapered multicore coupler for providing connectivity between the plurality of transmission cores of the multicore fiber and a respective plurality of individual transmission leads;
a fiber amplifier having a plurality of individual cores including at least one pump core and a plurality of amplifier cores;
a second tapered multicore coupler for providing connectivity between a plurality of amplifier input leads and a respective plurality of amplifier cores at an input endface of the amplifier fiber; and
a third tapered multicore coupler for providing connectivity, at an output endface of the amplifier fiber, between a plurality or amplifier output leads and a respective plurality of amplifier cores, and between a pump core lead and an amplifier pump core,
wherein the plurality of individual transmission leads are connected to respective amplifier input leads, such that individual cores of the multicore fiber are connected to respective amplifier cores of the fiber amplifier, and wherein the pump lead is connected to a pumping light source, and wherein the fiber amplifier is configured to provide mode coupling between the pump core and the amplifier cores, such that amplification is provided to respective light signals propagating through the amplifier cores.

* * * * *